United States Patent Office 3,222,138
Patented Dec. 7, 1965

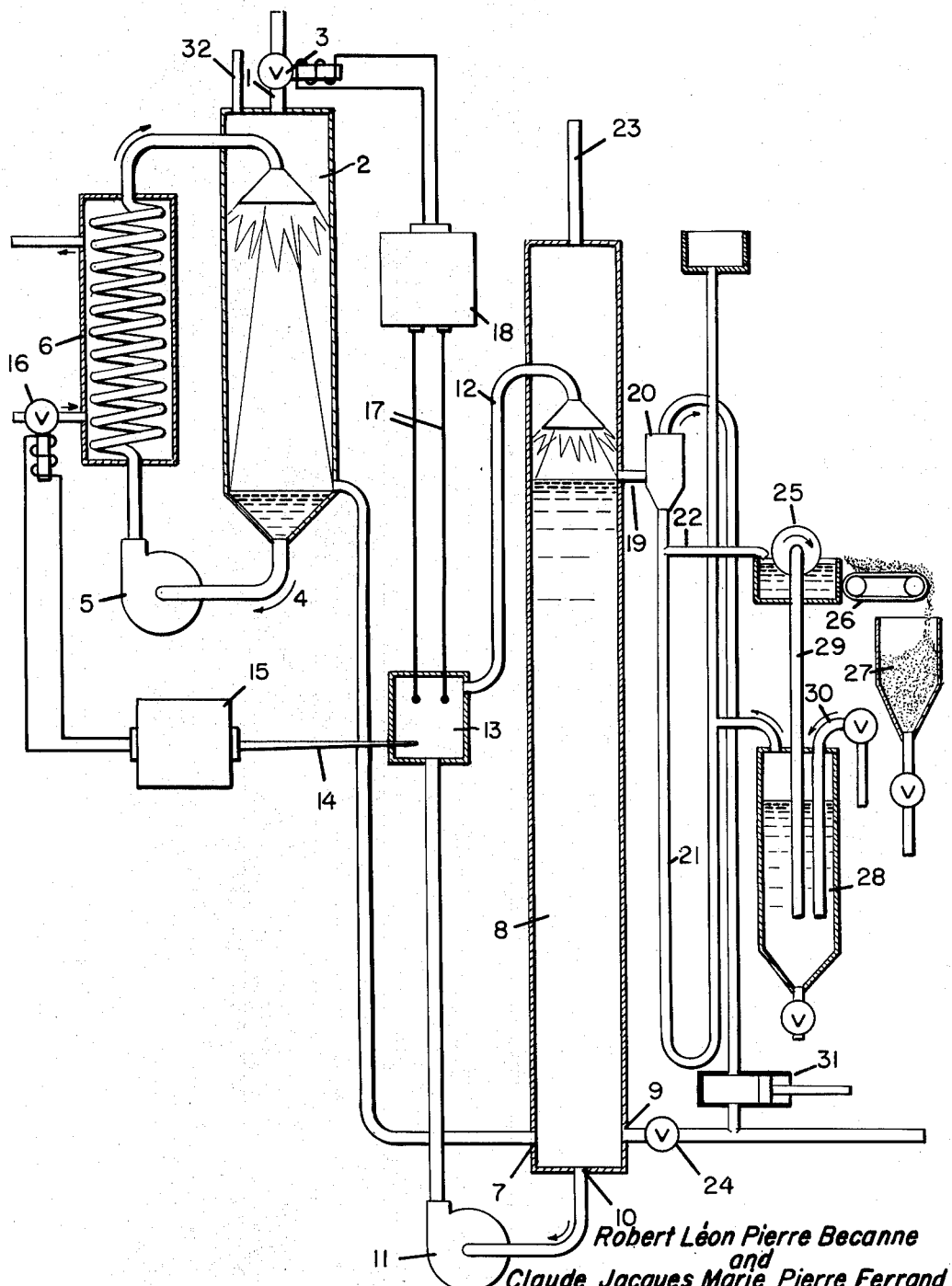

3,222,138
APPARATUS FOR THE CONTINUOUS MANUFACTURE OF CHLORINATED CYANURIC ACID
Robert Léon Pierre Becanne and Claude Jacques Henri Marie Pierre Ferrand, Haute-Garonne, France, assignors to Office National Industriel de l'Azote, Haute-Garonne, France
Filed Mar. 2, 1964, Ser. No. 348,544
Claims priority, application France, Dec. 19, 1960, 4,685; Mar. 4, 1963, 4,864
1 Claim. (Cl. 23—285)

The present application is a continuation-in-part of copending application Serial No. 134,759, filed August 29, 1961 now Patent No. 3,189,609.

In the aforesaid copending application there is disclosed a process for the production of trichlorocyanuric acid by reacting chlorine gas with an aqueous solution of cyanuric acid and alkaline hydroxide. This process, for the first time, enables the continuous production of substantially pure trichlorocyanuric acid in yields near theoretical by controlling the oxidation-reduction potential (redox-potential) of the mixed reactants to regulate the reaction rather than, as in the known processes, controlling the pH of the reactants.

The present invention relates to a novel apparatus for employing processes of the type described above. The apparatus may, for example, be regulated by making the supply of one of the reagents dependent on the redox-potential of the reaction mixture. The supply of the other reagents may then be used as a pilot-flow and can either be kept constant, or made responsive to another control variable, such as the chlorine content of the residual gases.

Accordingly, a primary object of the present invention is the embodiment of an apparatus for the continuous production of chlorinated derivatives of cyanuric acid and their salts, such as trichlorocyanuric acid or dichlorocyanuric acid, in a simple operation, rigorously controlled and capable of being integrally automatized; the conditions of the reaction being maintained appreciably constant at their optimum values, by making the supply of one or both of the reagents dependent on the redox-potential of the reaction mixture and providing a single chlorination zone.

Briefly stated, the apparatus of this invention consists of a feed and cooling zone, a single chlorinator column for controlled chlorination, a separation zone for separating the desired product, means to maintain the solution in the chlorinator at the required temperature, e.g., 0–16° C. when producing trichlorocyanuric acid, means for measuring the redox-potential of the reaction mixture, and, if circumstances so require, a de-gassing zone to release the chlorine gas from the mother-liquors.

The means for measuring the redox-potential which control the conditions of the reaction by controlling the delivery of the various reactants is preferably placed so that it measures the redox-potential of the reactants in the chlorinator column. However, in certain processes where fouling of the electrodes is inevitable because of the formation of crystals, one may, without departing from the scope of the invention, place the redox-potential measuring device within the mother-liquors of filtration.

More particularly, the apparatus of this invention has the following characteristics, singly or in combination:

(1) A feed and cooling zone containing, for example, an aqueous alkaline solution of cyanuric acid, which has a column which receives the said solution in its upper part, the greater portion of the solution being recycled to the top of said column by means of an exterior circuit having a circulation pump and means for cooling said solution; the cooled solution is then delivered, by means of a connecting tube, to the chlorinator, described infra.

(2) A chlorination zone having a single cylindrical vertical chlorinator whose height to diameter ratio is preferably great, for example, about 18 to 1 and which receives, in its lower portion, the cooled solution, the amount delivered being rigorously controlled, from the feed and cooling zone and also receives in its lower portion chlorine gas so that the chlorine is dispersed in said solution. A fraction of the resulting reaction medium is recycled from the bottom to the top of the chlorinator by means of an external circuit having a pump and a cell containing means for measuring the temperature and redox-potential and means for controlling the temperature of the solution in the feed and refrigeration zone and also means for controlling the delivery of said solution from the feed and cooling zone to the chlorinator. The produced crystals of chlorinated cyanuric acid and the mother-liquor are then transferred to a barometric tube where the mixture is degassed and then fed into a filtration zone, described more fully infra, where the crystals of chlorinated cyanuric acid are separated from the mother-liquor.

(3) A measuring and control cell in accordance with (2), supra, having:
  (a) Means for measuring and controlling the temperature of the reactive medium in the chlorinator at a substantially constant value by remotely controlling the delivery of the cooling liquid circulating in the cooling means in the feed and cooling zone described in (1).
  (b) Two or more electrodes for measuring the mean redox-potential of the reaction medium in the chlorinator, and means of remotely controlling the delivery of the refrigerated aqueous alkaline solution of cyanuric acid and/or the gaseous chlorine.

(4) A zone of filtration having conventional means for rapidly separating the crystals from the mother-liquors before drying. In accordance with one embodiment of the apparatus, the measurement of the redox-potential may be effected in the mother-liquors of filtration, instead of the secondary circuit of the zone of chlorination.

(5) A zone for degassing the mother-liquors which has a vat, which may be agitated and heated, wherein the said mother-liquors undergo acid treatment to release the chlorine. The chlorine is then passed into a compressor before being recycled back to the zone of chlorination.

Equations of typical degassing reactions are as follows:

$$2\ NaOCl + H_2SO_4 \rightarrow 2\ HOCl + Na_2SO_4$$
$$2\ NaCl + H_2SO_4 \rightarrow 2\ HCl + Na_2SO_4$$
$$HCl + HOCl \rightarrow Cl_2\uparrow + H_2O$$

The chlorine gas that is obtained may, after compression, be united with the original chlorine gas reactant before introducing the gas into the zone of chlorination.

In order that the invention may be clearly understood and readily carried into effect, it will be described more fully with reference to the accompanying drawing, it being understood that the following is given only by way of illustration and not by way of limitation.

The initial aqueous solution, containing cyanuric acid and alkaline hydroxide in proportions depending on the final product that it is desired to obtain—for example, if trichlorocyanuric acid is the desired end product then the molar ratio of cyanuric acid to alkaline hydroxide should be about 1:3—is introduced at 1 into column 2, the delivery thereof being regulated by automatic valve 3.

A major part of the aforesaid solution is drawn down tube 4, at the bottom of column 2, by means of circulation pump 5. The solution is then cooled to a temperature of between 0° and 16° C. by passing the solution through a conventional cooling system 6. The temperature is regulated by valve 16 which controls the flow of the cooling liquid into the cooling system 6. The cooled solution is recycled into the upper part of column 2.

The cooled solution is introduced at the lower portion 7 of chlorinator 8. The chlorine gas, carefully regulated by valve 24, is introduced at the same time into the lower portion 9 of chlorinator 8 and is uniformly distributed in the cyanuric acid solution by means of a distributing device, such as a diffuser known per se, not shown in the drawing.

A fraction of this solution, drawn off at 10 by means of the circulation pump 11, is reintroduced into the upper part of the chlorinator at 12, passing through the measurement and control cell 13.

The control cell 13 includes a device 14 for measuring temperature, which, by means of remote-control system 15, regulates automatic valve 16, which in turn regulates the delivery of the cooling liquid into cooling system 6 and, therefore, that of the temperature of the solution. The cell 13 also includes two electrodes 17 for measuring the redox-potential, which, by means of the remote-control device 18, regulates automatic valve 3, controlling the regulation of the delivery of the fresh solution of cyanuric acid. Of course, the remote-control device may similarly regulate valve 24, controlling the delivery of chlorine.

For measuring the redox-potential, it is preferred to use a platinum electrode and a calomel electrode in a KCl saturated solution.

The mash of crystals of the desired product and the mother-liquor leave the chlorinator 8 at 19 and enter the degassing tank 20 and then barometirc tube 21, leaving said tube at 22 and into filtering device 25 where the crystals are separated from the mother-liquor.

The chlorinator 8 as well as column 2 are connected to the atmosphere, respectively at 23 and at 32, so as to equalize the pressure. Since the reaction is practically complete because the redox-potential is carefully controlled, there is no ejection of residual chlorine from chlorinator 8 to the atmosphere.

The manufactured product is rapidly dried on a conveyor belt 26, before being poured into the bin for intermediate storage 27.

The mother-liquors of crystallization are introduced into vat 28 by means of piping 29 and enter into reaction with the acid proceeding from pipe 30. The vat 28 is, in principle, equipped with contrivances for heating and agitation not represented in the drawing. The thus produced chlorine gas is combined with the chlorine coming from the tank 20, and brought to suitable pressure in the compressor 31 before rejoining the principal delivery of chlorine introduced into the apparatus at 9.

Certain various operating conditions that may be used by the above-described apparatus are given in the following table together with the products and yields obtained therefrom.

| Operative conditions | Product obtained | | |
|---|---|---|---|
| | Trichloro-cyanuric acid | Dichloro-cyanuric acid | Potassium salt of dichloro-cyanuric acid |
| Composition of the aqueous solution: | | | |
| Cyanuric acid (g./l.) | 25.0 | 25.0 | 56.4 |
| Alkaline base (g./l.) | [1] 24.5 | [1] 16.3 | [2] 74.8 |
| Temperature of the solution at 13 (°C.) | 10 | 10 | 10 |
| Delivery of the solution at 7 (l./h.) | 1,220 | 1,825 | 858 |
| Delivery of chlorine at 9 (kg./h.) | 57.2 | 57.2 | 57.2 |
| Delivery of recyclage at 10 (m.³/h.) | 40 | 40 | 40 |
| Potential of oxido-reduction (mv.) | 1,130 | 1,120 | 950 |
| Production (kg./h.) | 51.0 | 60.8 | 75.2 |
| Purity (percent) | 99.6 | 98.5 | 99.4 |
| Yield percent in relation to cyanuric acid | 92.8 | 87.0 | 85.0 |
| Yield percent in relation to the chlorine | 81.3 | 76.0 | 79.0 |

[1] NaOH.  [2] KOH.

Dictionary of abbreviations:
- g./l.=grams per liter.
- l./h.=liters per hour.
- kg./h.=kilograms per hour.
- m.³/h.=cubic meters per hour.
- mv.=millivolts.

Having thus disclosed the invention, what is claimed is:

Apparatus for preparing chlorinated derivatives of cyanuric acid which comprises a chlorination column containing means for introducing gaseous chlorine in the lower portion thereof, means for controlling flow through said means for introducing gaseous chlorine, an inlet attached to the lower portion of said chlorination column for introducing a cooled aqueous solution of cyanuric acid and alkaline hydroxide, bypass means for recycling a portion of the thus-formed reaction mixture from the lower portion of said chlorination column to the upper portion of said chlorination column, a supply column, means for introducing an aqueous solution of cyanuric acid and alkali hydroxide into said supply column, means for controlling flow through said means for introducing said aqueous solution, circulating means for circulating said aqueous solution from the lower portion of said supply column to the upper portion of said supply column, cooling means operably connected to said circulating means to cool said aqueous solution, an outlet for removing said cooled aqueous solution from said supply column, said outlet attached to the inlet located in the lower portion of the chlorination column for introducing said cooled aqueous solution into said chlorination column, a temperature controller operably connected to said cooling means, a temperature sensing device in said by-pass means and operably connected to said temperature controller, an oxidation-reduction potential sensing device in said by-pass means and operably connected with at least one of the means for controlling the flow of gaseous chlorine and aqueous solution of cyanuric acid and alkaline hydoxide, means connected to the upper portion of said chlorination column for introducing the recycled portion of said reaction medium to a degassing chamber where part of the chlorine gas contained in said reaction medium is separated from the remaining portion of the reaction medium, means for introducing the remaining portion of said reaction medium to a separation chamber comprising means for separating the chlorinated cyanuric acid from the mother-liquors, means for introducing the mother-liquors into a reaction chamber comprising means for the introduction of an acid whereby said mother-liquors and said acid enter into a reaction with the liberation of chlorine gas, and means for combining the chlorine gas separated in the degassing chamber with the chlorine gas liberated in the reaction chamber and recycling same into the chlorination chamber.

References Cited by the Examiner

UNITED STATES PATENTS

| 2,825,630 | 4/1958 | Berger | 23—260 X |
| 3,117,954 | 1/1964 | Hupfer | 23—230 |

MORRIS O. WOLK, *Primary Examiner.*

JAMES H. TAYMAN, JR., *Examiner.*